F. C. LAMBERT.
ATTACHMENT FOR DENTAL PLUGGERS.
APPLICATION FILED MAY 12, 1913.
1,073,995.
Patented Sept. 23, 1913.
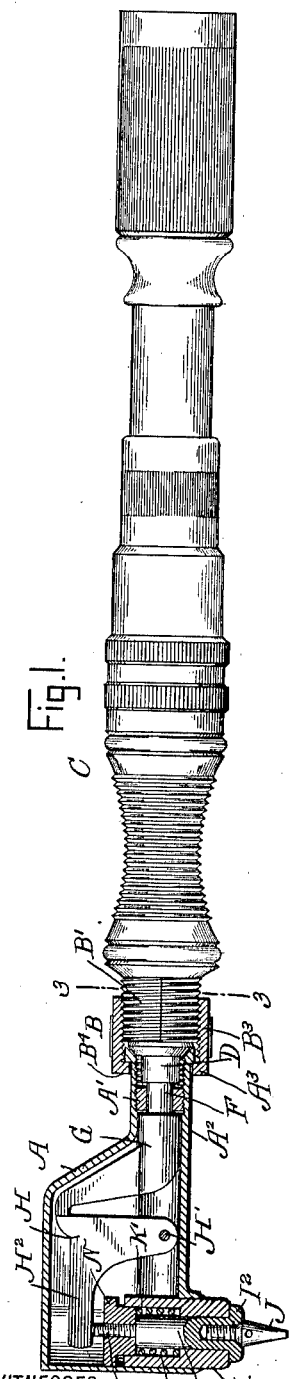
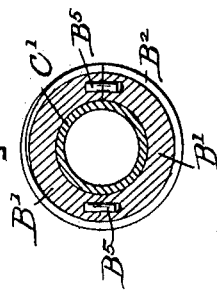
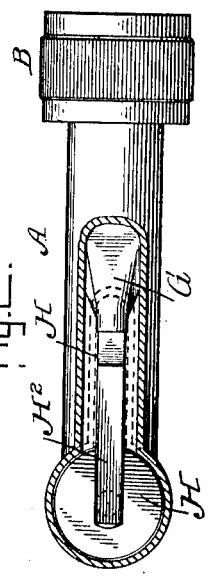
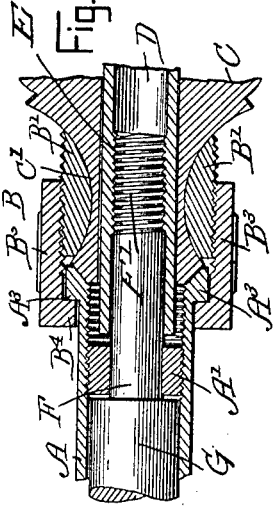
WITNESSES
INVENTOR
FREDERICK C. LAMBERT
BY
ATTORNEYS

UNITED STATES PATENT OFFICE.

FREDERICK C. LAMBERT, OF NEW YORK, N. Y., ASSIGNOR OF ONE-HALF TO GEORGE J. KOCH, OF NEW YORK, N. Y.

ATTACHMENT FOR DENTAL PLUGGERS.

1,073,995.  Specification of Letters Patent.  Patented Sept. 23, 1913.

Application filed May 12, 1913. Serial No. 767,173.

*To all whom it may concern:*

Be it known that I, FREDERICK C. LAMBERT, a citizen of the United States, and a resident of the city of New York, borough of the Bronx, in the county and State of New York, have invented a new and Improved Attachment for Dental Pluggers, of which the following is a full, clear, and exact description.

The object of the invention is to provide a new and improved attachment for dental pluggers and arranged to permit the user to conveniently and quickly place the attachment in position on the dental plugger whenever it is desired to use a plugging tool standing at an angle to the axis of the dental plugger.

In order to accomplish the desired result use is made of an attachment having a tool driven from the reciprocating spindle of the dental plugger and mounted to reciprocate at an angle to the axis of the dental plugger.

A practical embodiment of the invention is represented in the accompanying drawings forming a part of this specification, in which similar characters of reference indicate corresponding parts in all the views.

Figure 1 is a side elevation of a dental plugger provided with the attachment shown in section; Fig. 2 is a plan view of the attachment, part of the casing being shown in section; Fig. 3 is an enlarged cross section of the coupling for attachment to the dental plugger; and Fig. 4 is an enlarged sectional side elevation showing more particularly the connection of the attachment with the spindle of the dental plugger.

The attachment is mounted on a casing or frame A adapted to be coupled by a coupling B to the shell or casing C of a dental plugger of any approved construction, and which dental plugger is connected by a flexible shaft with a source of power and is provided with the usual tool-carrying spindle D and the usual mechanism whereby the tool is caused to strike a series of blows in rapid succession. The forward end of the spindle D of the dental plugger is provided with an internal screw thread E into which screws the threaded end F' of a shank F mounted to slide in a bearing A' screwed or otherwise secured in the casing A. On the shank F is secured an angular arm G engaging the free end of a lever H fulcrumed at H' in the casing A, as plainly indicated in Fig. 1. The lever H is provided with an angular arm H² standing approximately parallel to the axis of the dental plugger and engaging a striking pin I' held on the inner end of a tool holder I carrying at its lower outer end a removable tool J in the form of a plugger, hammer or the like, according to the use to be made of the tool. The tool holder I extends at a right angle to the axis of the dental plugger, and the tool holder is mounted to slide in a bearing K held or formed on the casing A. The inner end of the bearing K is provided with a counter bore K' containing a spring L coiled around the tool holder I and abutting against a collar N screwed or otherwise secured to the striking pin I' so that the said striking pin is held in contact with the arm H² of the lever H. The inward movement of the tool holder I is limited by a collar I² held on the outer end of the tool holder and adapted to abut against the outer end of the bearing K. When the casing A is attached to the dental plugger C and the latter is actuated in the usual manner then the blows given to the spindle D are also imparted to the shank F and the arm G which latter delivers the blows to the lever H, and the latter in turn by the arm H² delivers the blows to the striking pin I' of the tool holder I so that the tool J delivers the blows to the desired part intended to receive the blows. It is understood that the return movement of the tool holder I is caused by the spring L.

By arranging the tool holder I and the tool J in the manner described, the tools can be readily used in places practically inaccessible by the pluggers or hammers attached to the spindle D of the dental plugger, owing to the hammer J standing at a right angle to the axis of the power mallet.

The coupling B for connecting the casing A to the casing C of the dental plugger, preferably, consists of a two-part member B' fitting onto the reduced concave neck C' of the casing C, and the said two-part member B' is provided with an exterior screw thread B² onto which screws the coupling nut B³ having a flange B⁴ mounted to turn on the tubular end A² of the casing A and abutting against the shoulder A³ on the said end A². By the arrangement described, the attachment can be conveniently coupled to the dental plugger as now generally constructed by simply placing the two-part member B' onto the neck C' and then screwing the nut B³ onto the said two-part member B' to fasten the casing A in position on the end of the casing C, as plainly indicated in the drawings. The parts of the member B' are preferably fastened together by dowels B⁵, as indicated in Fig. 3.

From the foregoing it will be seen that the attachment can be very quickly coupled to the dental plugger and when in use the tool strikes blows in a direction at a right angle to the axis of the dental plugger.

Having thus described my invention, I claim as new and desire to secure by Letters Patent:

In combination with a dental plugger having a main casing provided with a concave neck and a tool spindle mounted to reciprocate in the said main casing, of an attachment casing, a coupling nut held on the said attachment casing, a two-part coupling member fitting on the said concave neck and provided with an exterior screw thread engaged by the said coupling nut, a driving member slidable in the said attachment casing and removably attached to the said spindle, an angular arm on the said driving member, a lever fulcrumed in the said attachment casing and engaged by the said angular arm, and a spring-pressed tool holder mounted to reciprocate at an angle to the axis of the said driving member, the said tool holder being engaged by the said lever.

In testimony whereof I have signed my name to this specification in the presence of two subscribing witnesses.

FREDERICK C. LAMBERT.

Witnesses:
   THEO. G. HOSTER, Jr.,
   PHILIP D. ROLLHAUS.

---

Copies of this patent may be obtained for five cents each, by addressing the "Commissioner of Patents, Washington, D. C."